United States Patent [19]

Garman

[11] Patent Number: 4,554,720

[45] Date of Patent: Nov. 26, 1985

[54] APPARATUS AND METHOD FOR TURNING A TRACK BUSHING

[75] Inventor: James A. Garman, Eureka, Ill.

[73] Assignee: Caterpillar Tractor Co., Peoria, Ill.

[21] Appl. No.: 640,056

[22] Filed: Aug. 13, 1984

[51] Int. Cl.[4] .......................... B25B 13/48; B23P 7/00
[52] U.S. Cl. ................................ 29/402.01; 81/57.39; 81/487
[58] Field of Search .................. 29/402.01, 401.1, 427, 29/149.5 R, 149.5 C, 252; 81/57.32, 57.33, 57.29, 57.39, 57.46, 74, 487, 464; 59/35.1

[56] References Cited

U.S. PATENT DOCUMENTS

| 3,915,036 | 10/1975 | Vanlandingham et al. |
| 4,002,090 | 1/1977 | Vanlandingham et al. |
| 4,050,141 | 9/1977 | Vanlandingham et al. |
| 4,128,932 | 12/1978 | Vanlandingham et al. |
| 4,187,744 | 2/1980 | Livesay. |
| 4,202,224 | 5/1980 | Hooker et al. |
| 4,277,876 | 7/1981 | Livesay. |

Primary Examiner—Lowell A. Larson
Assistant Examiner—Jorji M. Griffin
Attorney, Agent, or Firm—O. Gordon Pence

[57] ABSTRACT

Apparatus and method of turning a bushing of a track chain link assembly is disclosed which enables the bushing to be turned in place in the link assembly, thereby eliminating the need to disassembly the link assembly in order to effect the bushing turn.

The apparatus includes clamping means having three jaws for clamping the bushing, each of which has a deformable insert of an aluminum alloy so that, upon application of the clamping force, the shape of insert can change to accommodate one-sided sprocket wear on the bushing and insure intimate clamping contact therewith. Each of the deformable inserts is supported on an arcuate surface of a support block which has apertures and grooves for providing space into which material of the insert can extrude to facilitate the ability of insert to conform to the bushing.

The grooves are oriented longitudinally so as to provide a mechanical interlock between the insert and the support blocks, thus eliminating any slippage between the block and insert as the links are being rotated.

22 Claims, 11 Drawing Figures

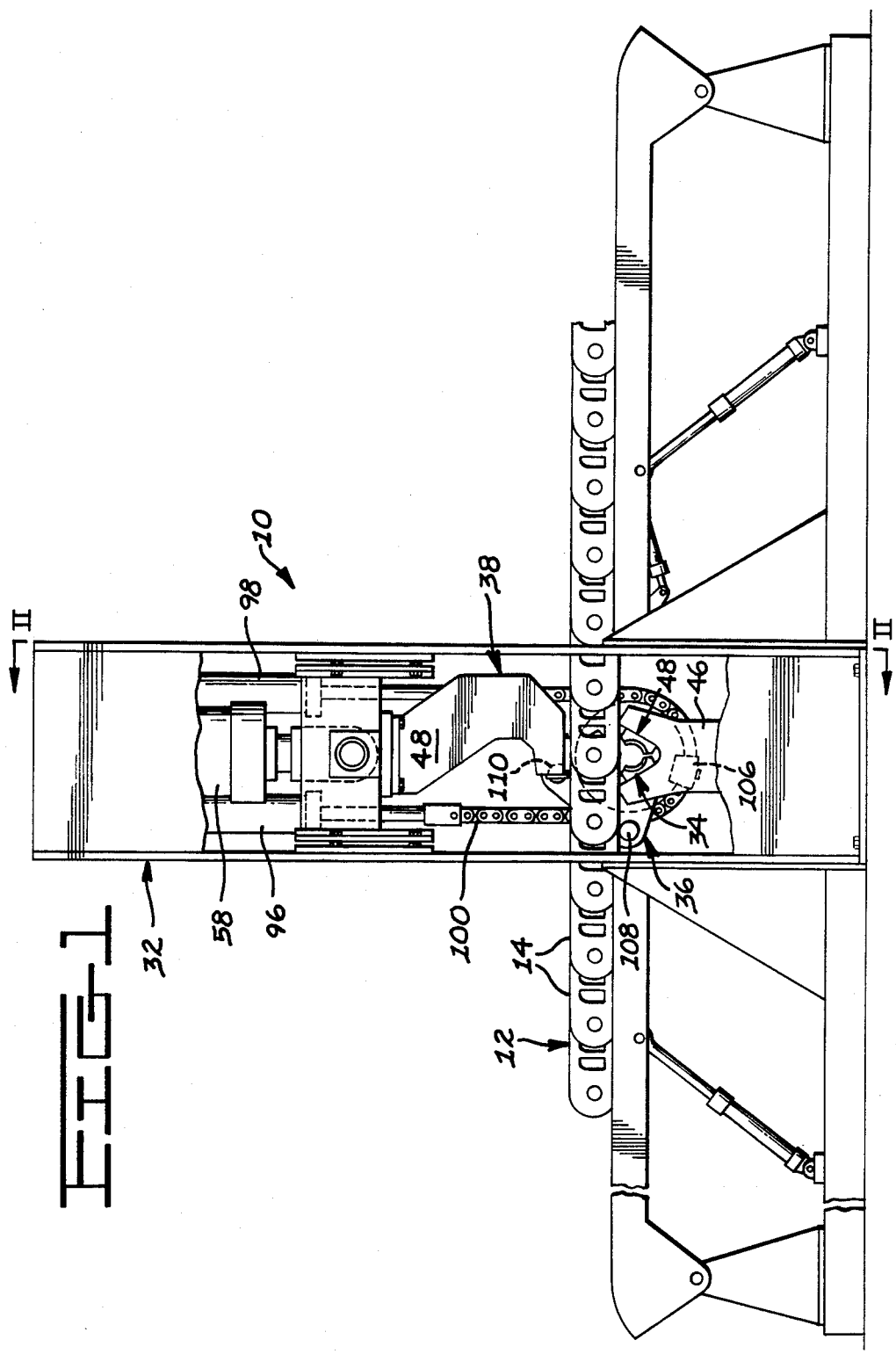

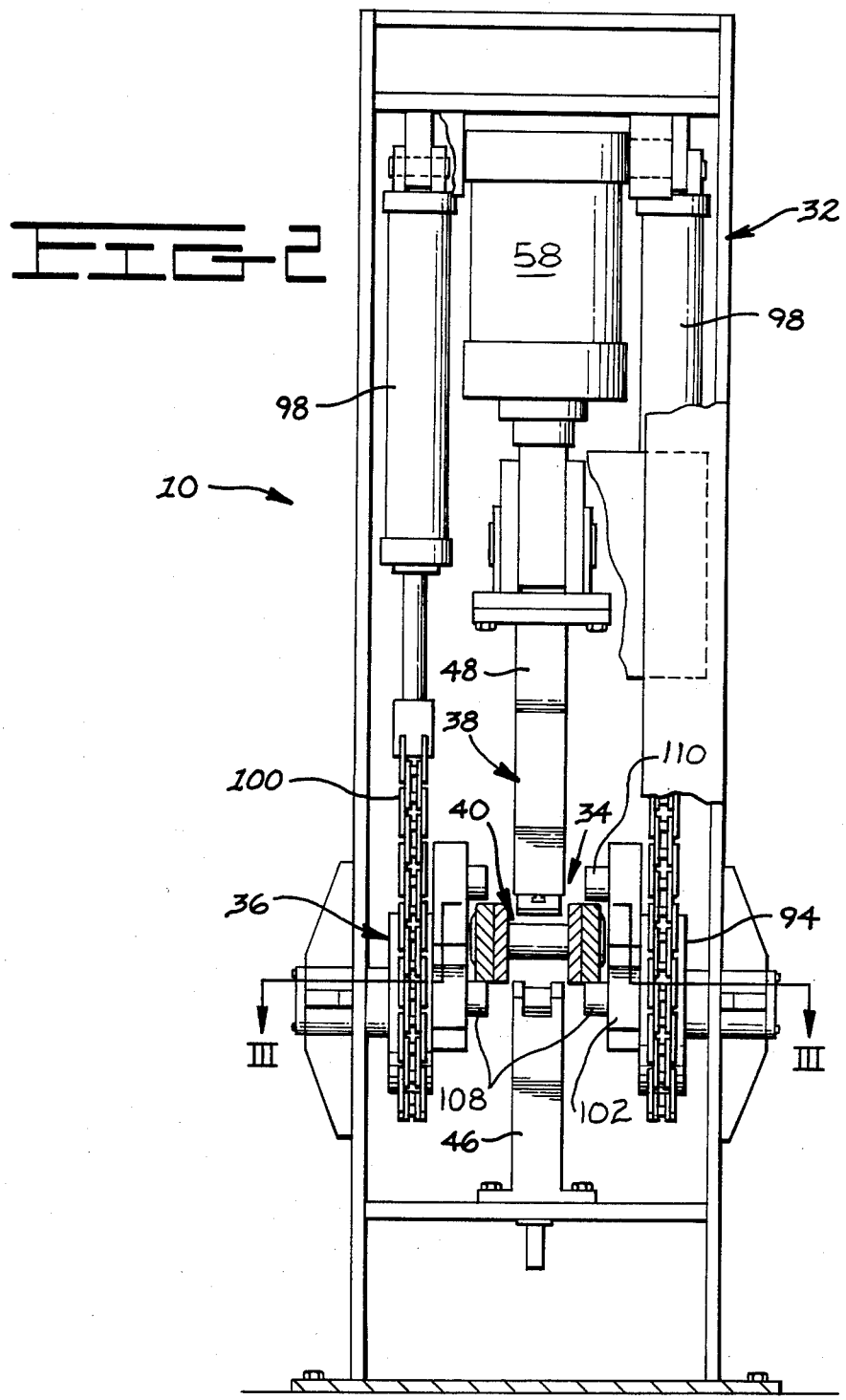

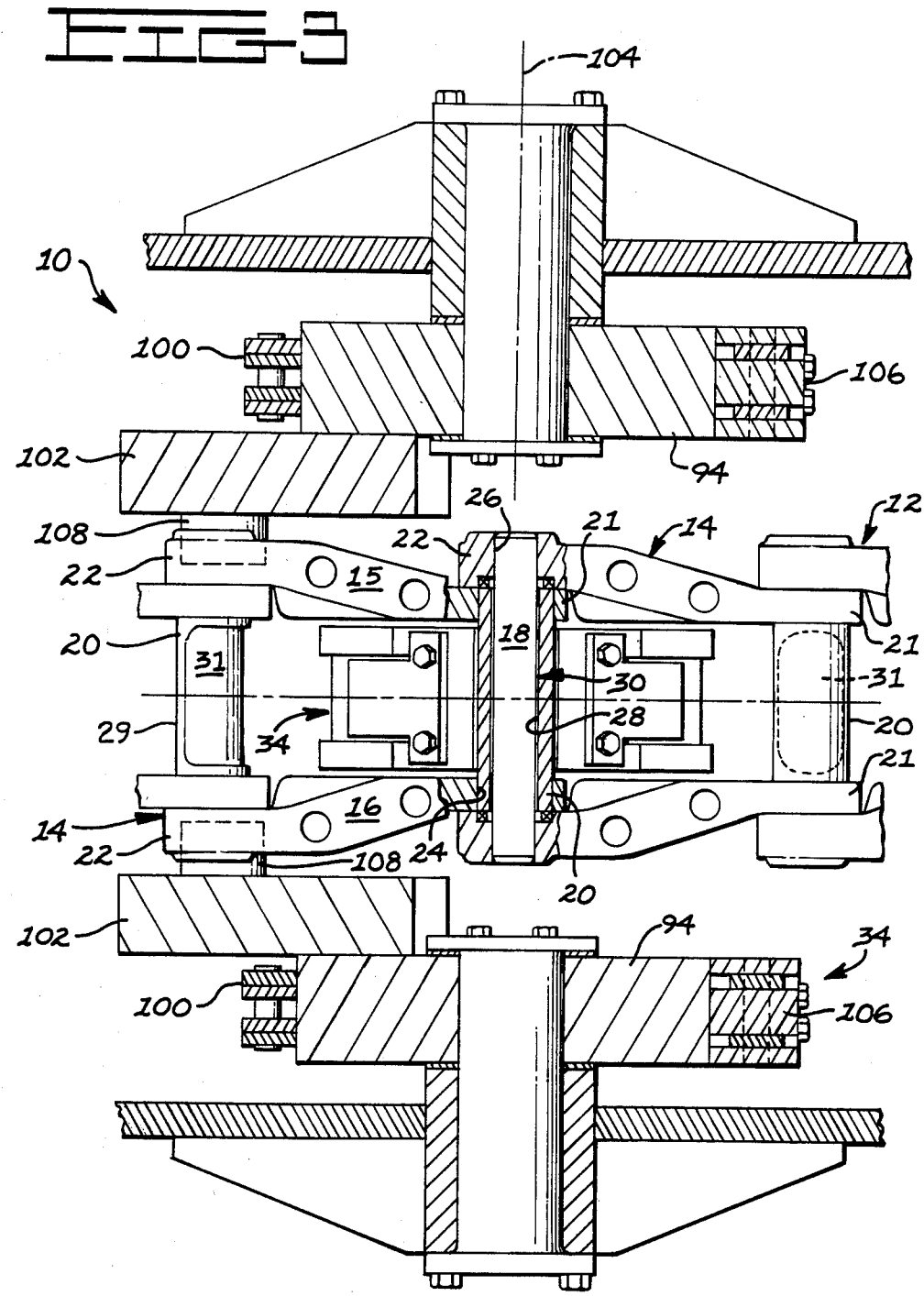

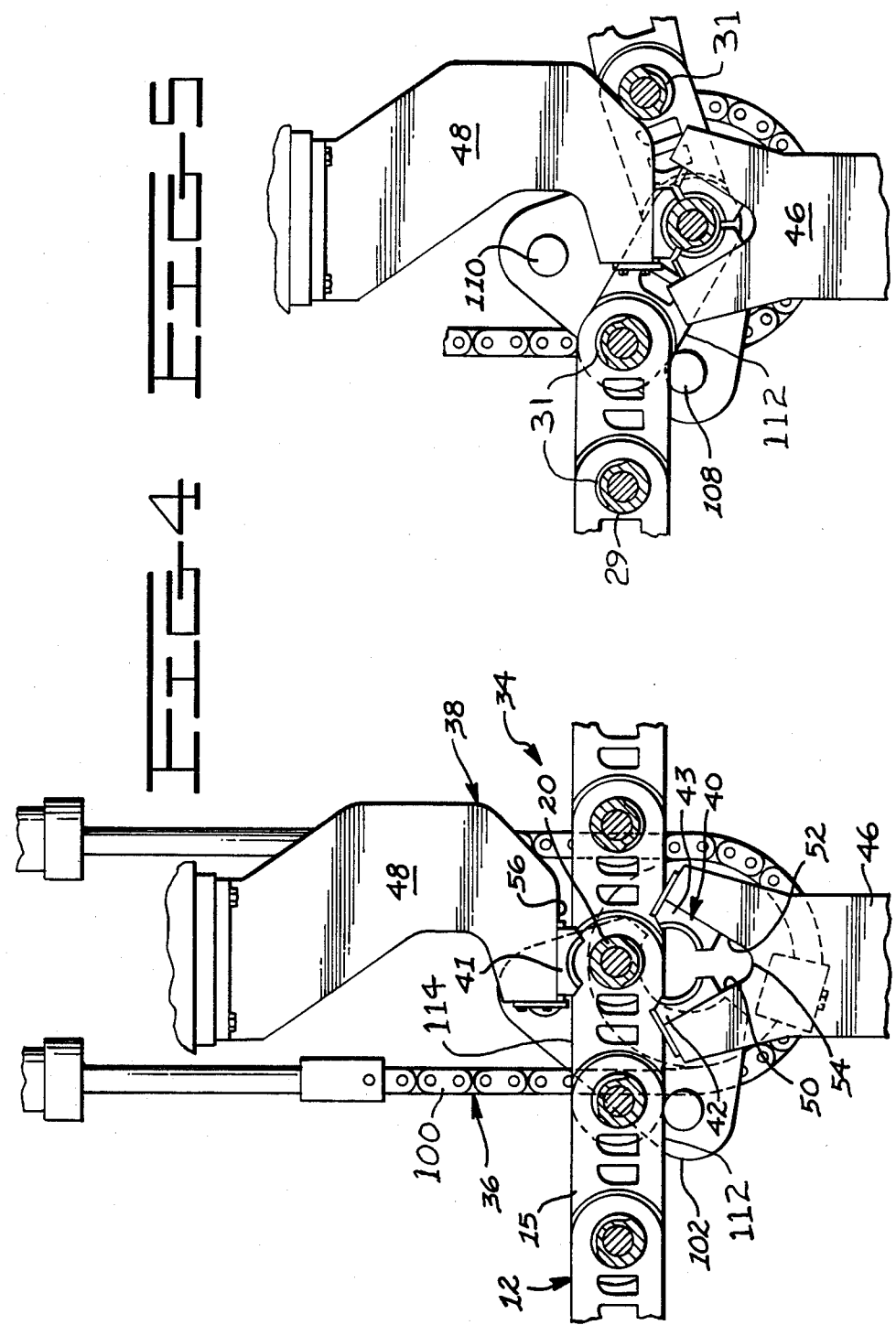

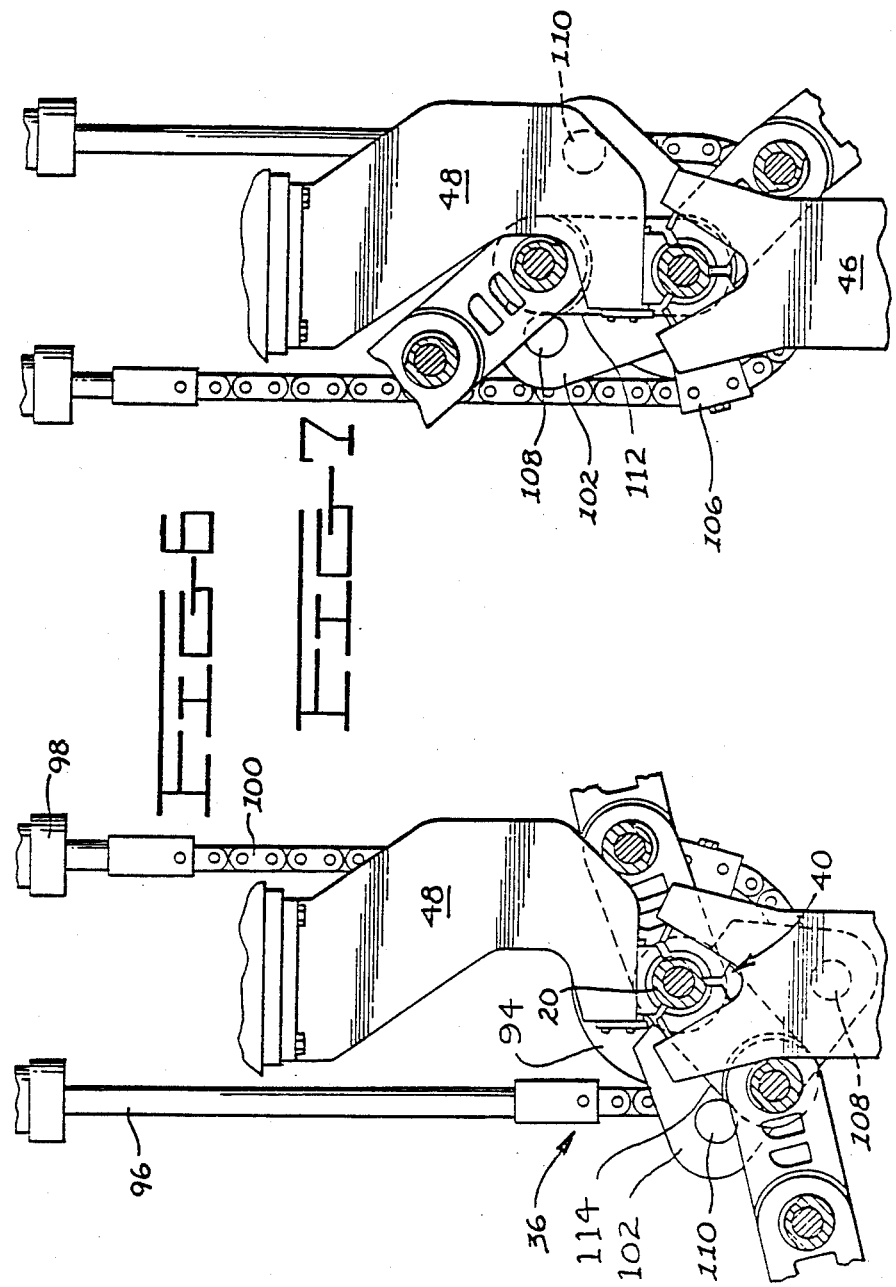

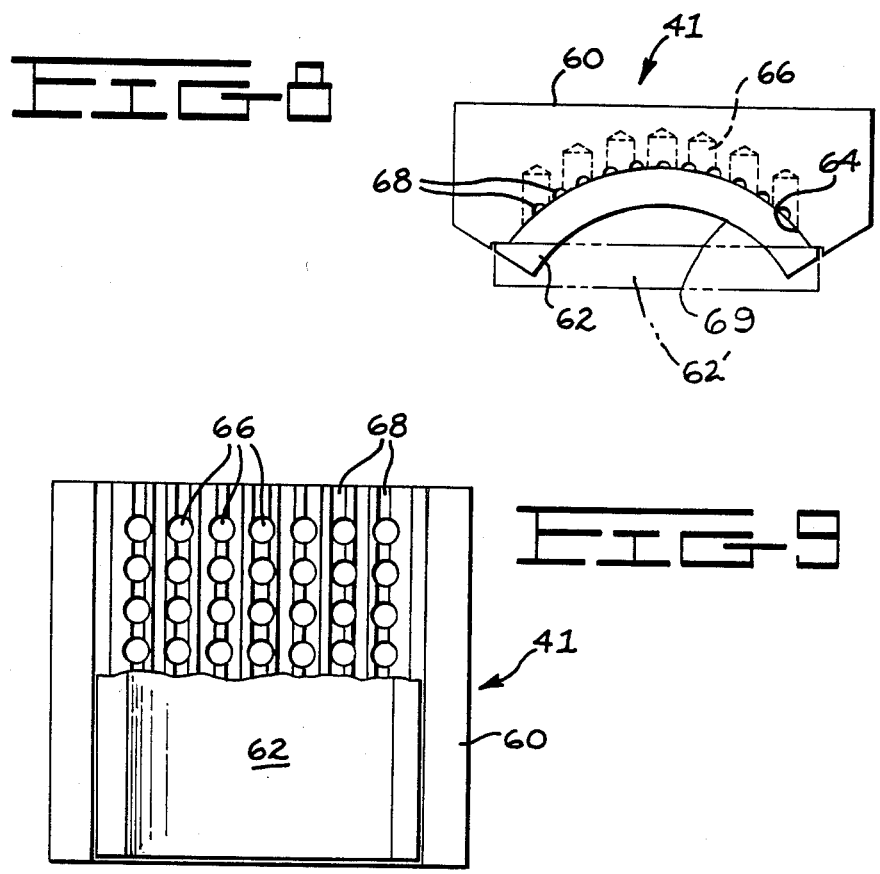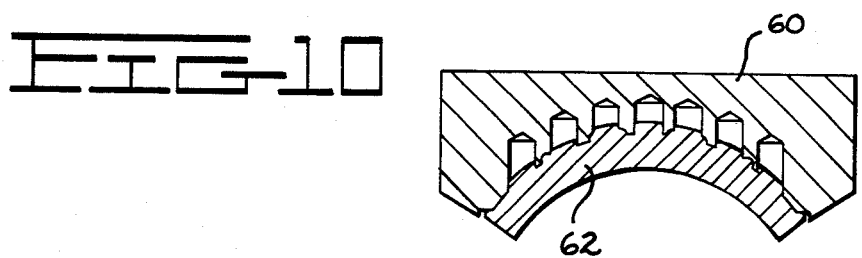

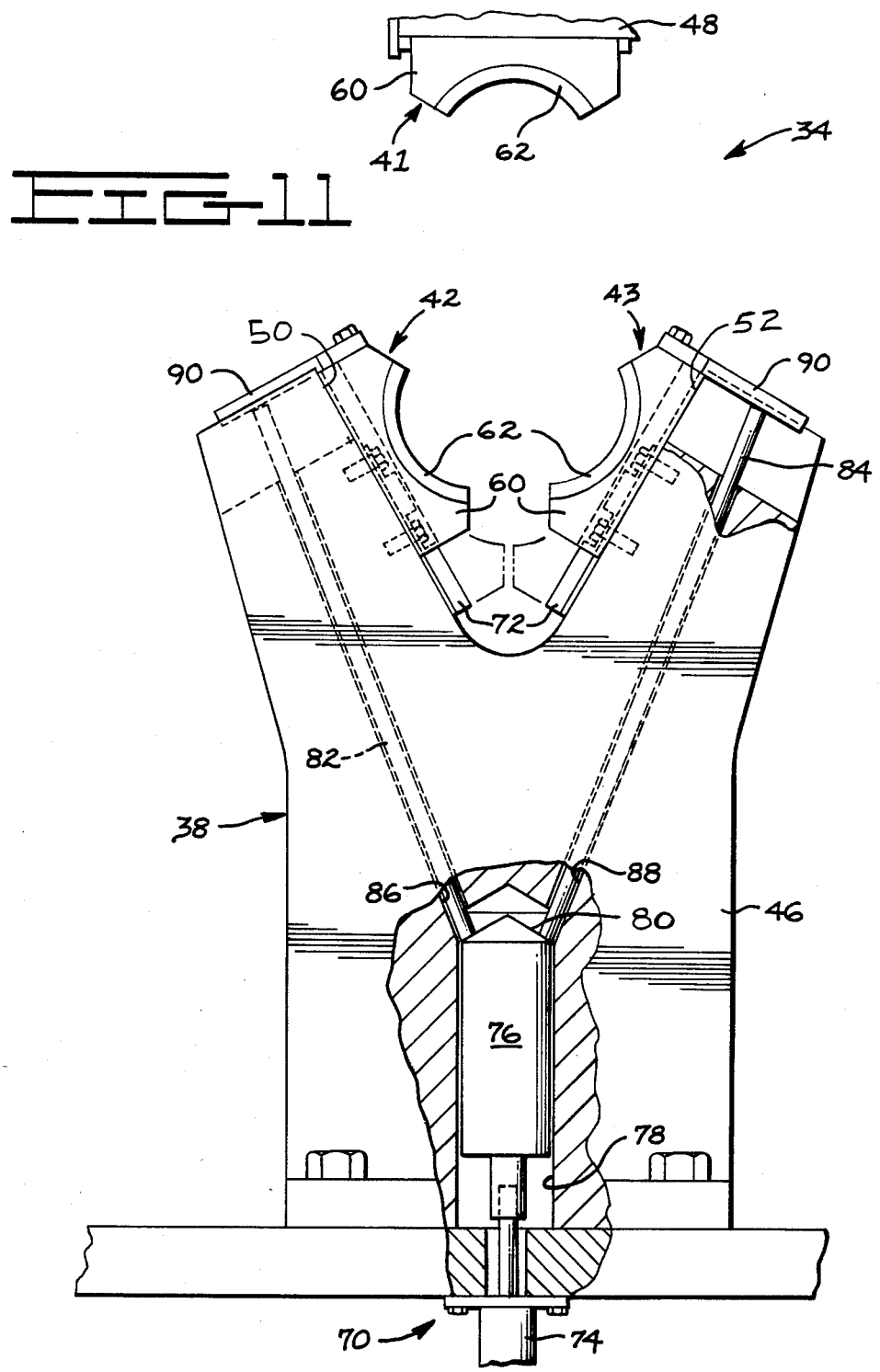

APPARATUS AND METHOD FOR TURNING A TRACK BUSHING

DESCRIPTION

1. Technical Field

This invention relates to apparatus and method for turning track bushings to expose an unworn portion of the bushing to the drive sprocket of a track-type vehicle and, more particularly, to turning such track bushings while they remain press fitted into their respective links of the track chain link assembly.

2. Background Art

Track chains are used to support and propel track-type vehicles and are typically constructed from an endless, articulately coupled link assembly which has a plurality of track shoes bolted thereto. The link assembly has a plurality of pivot joints provided by pin and bushing connections. In addition to forming a portion of the pivot connection, the bushing is used as the drive connection of the track chain with the vehicle through engagement with the drive sprocket of the tractor. As a result of the driving engagement of the bushing with the sprocket, the one side of the bushing which engages such sprocket receives a high amount of wear, while the opposite side of the bushing is substantially free of wear.

In order to compensate for this one sided wear and to utilize the wear life available on the opposite, unworn side of the bushing, it has long been the practice to perform an operation, called "turning the bushings", which means to rotate the bushings relative to their respective links so as to expose the opposite, unworn side thereof to the sprocket and to place the worn side away from the sprocket. The oldest and most common method yet today of accomplishing the above bushing turn is through the complete disassembly of the track chain and then the reassembly of the chain with the bushings mounted in a new rotational position relative to their respective links. This disassembly, reassembly process is very time-consuming and labor intensive. In addition, if the track chain being disassembled is a sealed and lubricated chain, this process causes a complete loss of the lubricant, as well as causing the critical seal of such track to be disturbed. Consequently, it is highly desirable to be able to accomplish the bushing turn to present a new wear surface to the sprocket without this complete disassembly and reassembly of the track chain.

Various examples of methods and apparatus for turning bushings while the track chain remains on the vehicle are disclosed in the following group of related patents: U.S. Pat. No. 3,915,036 granted Oct. 28, 1975, U.S. Pat. No. 4,002,090 granted Jan. 11, 1977 as a division of the U.S. Pat. No. 3,915,036, U.S. Pat. No. 4,050,141 granted Sept. 27, 1977 as a continuation of abandoned U.S. application Ser. No. 617,346, filed Sept. 29, 1975 as a division of the U.S. Pat. No. 3,915,036, and U.S. Pat. No. 4,128,932 granted Dec. 12, 1978 as a division of the U.S. Pat. No. 4,002,090, all of which had Vanlandingham, Boggs, Bullock, and Maytum as common joint inventors and all assigned to the assignee hereof. U.S. Pat. No. 4,202,224 issued May 13, 1980 to Hooker et al. (assigned to the assignee hereof) discloses apparatus for providing dynamic torque multiplication to the apparatus of the above-cited U.S. Pat. No. 3,915,036.

U.S. Pat. No. 4,187,744 granted Feb. 12, 1980 and U.S. Pat. No. 4,277,876 granted July 14, 1981 as a division thereof, both issued to Richard E. Livesay and assigned to the assignee hereof, disclose further apparatus and method for turning a bushing while the track chain remains in place on the vehicle.

Clamping and torsional forces exerted by prior bushing turning devices may be applied unevenly or on small localized areas of the bushing. As a force required to turn the bushing is quite high due to the heavy press fit securing it to the links, the application of these forces on such localized areas can overstress the bushing, causing cracks and/or breakage of the bushing. If this occurs, such cracked or broken bushing must be removed and a new bushing put in its place.

The present invention is directed toward overcoming one or more of the problems as set forth above.

DISCLOSURE OF THE INVENTION

In accordance with one aspect of the present invention, an apparatus is provided for turning a track bushing relative to its respective set of links of a track chain link assembly while such links remain press fittedly connected to the bushing. The apparatus includes means for clamping the bushing about its outer peripheral surface with a clamping force sufficient to restrain the bushing against an application of a torsional force of sufficient magnitude to overcome the press fit connection between the bushing and the links. The clamping means is provided with at least one deformable insert engageable against the bushing, which insert is of a sufficiently soft material to substantially conform to and have intimate contact with the bushing upon and under the application of the clamping force. The apparatus also includes means for selectively rotating the links a predetermined angular distance relative to the bushing while the bushing is being restrained by the clamping means.

In another aspect of the present invention a method for turning a bushing of a track chain link assembly is provided comprising the step of clamping the bushing with a clamping device capable of exerting a predetermined clamping force on the bushing. The clamping device has at least one deformable insert engageable against the bushing. The insert is of a sufficiently soft material to conform to and have intimate contact with the bushing upon and under the application of the clamping force. The method further includes rotating the set of links a preselected angular distance relative to the bushing.

BRIEF DESCRIPTION OF THE DRAWINGS

FIG. 1 is a side elevational view of a track bushing turning apparatus embodying the principles of the present invention, but with a portion of the near side plate broke away to expose some of the internal mechanism of the apparatus;

FIG. 2 is a front elevational view of the apparatus illustrated in FIG. 1;

FIG. 3 is a cross-sectional plan view taken generally along line 3—3 of FIG. 2;

FIGS. 4–7 are generally schematic side views illustrating sequential operating positions of the apparatus of the present invention;

FIG. 8 is an enlarged side view of one of the jaws of the present invention;

FIG. 9 is an enlarged bottom view of the jaw illustrated in FIG. 8;

FIG. 10 is an enlarged view similar to FIG. 8, but shown in section and with an insert of the jaw in a deformed condition; and, FIG. 11 is a somewhat enlarged side view of the V-block of the present invention illustrating the lower jaws' opening mechanism.

BEST MODE FOR CARRYING OUT THE INVENTION

Referring more particularly to the drawings, an apparatus, embodying the principles of the present invention, is generally depicted by reference numeral 10 in FIG. 1. The apparatus 10 is particularly designed for turning bushings of a track chain link assembly 12, which link assembly is used for propelling a track-type vehicle, not shown.

As best shown in FIG. 3, the link assembly 12 is constructed, in a typical manner, from a plurality of articulately coupled link sections 14. Each link section 14 includes a set of links, one being a left hand link 15 (the upper link as depicted in FIG. 3) and the other being a right hand link 16 (the lower link as depicted in FIG. 3), a pin 18, and a bushing 20. Each of the links 15,16 has opposite, laterally offsetting ends, an inboard end 21 and an outboard end 22. The offset allows the outboard end 22 of the links of one link section 14 to overlap the inboard ends 21 of the next succeeding link section.

The inboard ends 21 of the links 15,16 each have a larger bore 24 for receiving a respective end of the larger diameter bushing 20. The outboard ends 22 of the links 15,16 each have a smaller bore 26 for receiving a respective end of the smaller diameter pin 18. The opposite ends of the pins 18 and the bushings 20 are secured into their respective bores 26,24 by means of a heavy press fit which is sufficiently great to secure and maintain the pins, bushings, and links of each of the link sections 14 as a rigid, unitary member. The pin 18 of one link section is freely received within a bore 28 of the bushing 20 of the adjoining link section for providing a pivot connection 30 between the adjoining link sections 14.

The bushings 20 have an outer peripheral surface 29 which, in use, is drivingly engaged by the drive sprocket of the vehicle. As the bushings 20 are maintained in a fixed angular relation to their respective link sections 14, the drive sprocket only contacts a portion of the outer surface of the bushing, causing one sided wear on the outer surface of the bushings. This typical one sided wear pattern is indicated at 31 in FIG. 3.

Having described the construction of a typical link assembly 12, the apparatus 10 for turning the bushings 20 while such bushings remain press fittedly connected into their respective links 15,16 will now be more fully described.

As best shown in FIGS. 1 and 2, the apparatus 10 includes a framework 32 of any suitable construction to operatively mount means 34 for clamping one of the bushings 20 of the link assembly 12 and means 36 for rotating the set of links 15,16 press fittedly connected to such bushing. As the construction of the framework 32 is not considered to be within the pervue of the novel features of the present invention, it being understood that one skilled in the art would be capable of constructing any number of suitable frameworks, such framework 12 will not be hereinafter described except where necessary to the complete understanding of other components of the apparatus 10 to be hereinafter described.

As best shown in FIGS. 1–4, the clamping means 34 includes a press, generally indicated at 38, which, in the preferred embodiment disclosed herein, has a three jaw arrangement 40 consisting of a first jaw 41, a second jaw 42, and a third jaw 43. It should be understood, however, that the present invention is not intended to be limited to a three jaw arrangement, as other arrangements having a fewer or greater number of jaws is well-known in the art.

The press 38 also includes a V-block 46 and a movable ram 48. The V-block 46 has a pair of inwardly facing surfaces 50,52 which diverge outwardly from the base 54 of the V defined by the block. The ram 48 has an opposing surface 56 facing the base 54 of the V of the block 46. The first jaw 41 is carried upon the surface 56 of the ram, while the second and third jaws 42 and 43 are carried upon the surfaces 50 and 52 of the V-block 46, thereby locating the jaws in a generally equilateral triangular configuration, preferably oriented at an angle of approximately 60° to each other.

The V-block 46 is secured and rigidly supported by the framework 32 in any well-known manner, whereas the movable ram 48 is guidably mounted for movement in a generally vertical direction in the framework. The ram 48 is selectively actuated by a hydraulic jack 58 shown in FIG. 1. The ram 48 also preferably has an offset or C-shaped configuration to provide a greater angular rotational movement of the links 15,16 between the V-block 46 and the ram 48, as will hereinafter be more fully described.

At least one of the jaws, such as jaw 41 depicted in FIGS. 8 and 9, is constructed in accordance with the present invention, it being understood that the other two jaws 42,43 are likewise preferably constructed in a manner hereinafter described and as shown in the drawings. In FIGS. 8 and 9, jaw 41 includes a support block 60 and a deformable insert 62. The block 60 is constructed of a rigid material, such as steel, and preferably has a generally arcuate surface 64 which faces the bushing 20 to be turned by the apparatus 10 and on which the insert 62 is carried. The arcuate surface 64 preferably includes a plurality of discontinuities, such as apertures 66 and grooves 68. Such apertures and grooves provide cavities into which material of the insert 62 is extruded, as will hereinafter be described. The grooves 68 are also preferably oriented in a longitudinal direction along the arcuate surface 64 defining gripping edges to provide a mechanical interlock between the block 60 and the insert 62, thus restraining rotational movement therebetween during turning of the bushing, as will be hereinafter more fully described.

The insert 62, on the other hand, is constructed of a softer, deformable material, such as aluminum so as to enable it to conform to the shape of the bushing 20 upon application of the clamping force exerted by the press jack 58. An aluminum alloy, designated by the Aluminum Association as 6061, has been found to be suitable for the insert. Also, tempering of the aluminum to a hardness of about T4 has shown to provide a greater life to the insert, without making the insert unduly hard or nondeformable. The insert 62 may advantageously start as a flat rectangularly shaped plate, as shown in phantom at 62' in FIG. 8, such plates being economically cut to size from a larger plate of aluminum. Such rectangular plate 62' may then be preformed into its arcuate configuration, as shown in solid lines in FIG. 8, by the apparatus 10. This may be accomplished by placing the flat inserts across their support blocks 60 as shown in FIG. 8 and then closing the clamping means 34 about a bushing 20 or like shape object to bend the insert to shape and provide the insert with an arcuate surface 69.

The support block 60 of jaw 41 is mounted to the surface 56 of the ram 48, whereas the blocks 60 of jaws 42,43 are mounted on surfaces 50,52, respectively, of the V-block 46.

The construction of the lower jaws 42,43 is preferably substantially identical with the above-described jaw 41. However, means 70 for selectively opening the lower jaws 42,43 are provided to enable the radial insertion of the track bushing 20 between such lower jaws, as best shown in FIG. 11. The opening means 70 includes slide apparatus 72 for slidably mounting each of the jaws 42,43 on a respective one of the surfaces 50,52 of the V-block 46. The opening means 70 also includes a hydraulic jack 74, which is shown mounted under the V-block 46. The jack 74 is connected to a piston 76 which is slidably mounted in a bore 78. The piston 76 preferably has a conically shaped upper end 80 for engaging a pair of connecting rods 82,84. The rods 82,84 are slidably mounted in bores 86,88, respectively, and extend through the respective halves of the V-block 46 and engage an arm 90 provided on each of the support blocks 60 of the jaws 42,43. Thus, upon extension of the jack 74, each of the jaws 42,43 is moved upwardly and outwardly on its respective mounting surface 50,52 from a closed position, shown in phantom, to an open position, shown in solid lines in FIG. 11, thus enabling the track bushing to be inserted therebetween.

The rotating means 36 of the apparatus 10 preferably includes two opposing apparatus sets, each of which is disposed on a respective one of the opposite sides of the clamping means 34 as best shown in FIGS. 2 & 3. As each set of apparatus is a mirror image of the other, similar reference numerals will be hereinafter used to depict similar parts of both sets of such apparatus. With this in mind, each set of apparatus of the rotating means 36 includes a pulley wheel 94, a pair of hydraulic jacks 96,98, a flexible pull or chain 100, and a link engaging member 102. Each pulley wheel 94 is rotatably mounted to the framework 32 about an axis 104 which axis is disposed in general alignment with the longitudinal axis of the bushing 20 being clamped by the clamping means 34. The chain 100 is entrained about the pulley wheel 94 and connected thereto in any suitably manner, such as by an inset block shown at 106 in FIG. 1, so as to impart a rotating torque to the pulley wheel 94. The chain 100 has its opposite ends attached to respective ones of the pair of jacks 96,98. The jacks 96,98 are preferably vertically mounted in the framework 32 in a conventional manner on opposite, tangential sides of the pulley wheel 94.

The link engaging member 102 is carried upon the pulley wheel 94 and preferably includes a pair of inwardly extending portions or bars 108,110. Bar 108 is constructed so as to extend under a respective one of the links 15,16 of the link section 14 being clamped and to engage a lower surface 112 (FIG. 4) of such links 15,16. The upper bar 110 is constructed to extend over such links 15,16 and engage an upper surface 114 of such links. The bars 108,110 are spaced a sufficient distance apart to freely permit the ingress and the movement of the link assembly 12 therebetween. Each bar 108,110 is also spaced a predetermined radial distance from the axis 104 of the pulley wheel 94 so that the bars engage the links adjacent the opposite or outboard ends 22 of such links and provide a greater movement arm for rotating the links about the bushing in the manner hereinafter described.

Industrial Applicability

The apparatus 10 of the present invention is particularly adapted for turning bushings 20 of track link assemblies 12 while the bushings remain press fitted into their respective links 15,16, thus avoiding the time and effort required to disassemble the entire link assembly 12.

The process for turning the bushings of each link section is as follows: First, the press jack 58 is retracted to raise the ram 48 and the jack 74 of the jaw opening means 70 is extended to raise the two lower jaws 42,43 on the V-block 46 to their open position, as best shown in FIG. 4. With the three jaws in their open positions, the link assembly 12 may be moved longitudinally through the apparatus 10 in order to position the bushing to be turned in the proper position so as to be clamped by the clamping means 34.

Second, the press jack 58 is then extended and the jaw opening jack 74 is allowed to retract until the jaws 41,42,43 are somewhat loosely closed about the bushing 20 to be turned, as shown in FIG. 5. At this time, however, the bushing is not being clamped by the jaws.

Third, the link section 14 is rotated to a first or starting position, as shown in FIG. 6. This is accomplished by retracting jacks 98 and extending jacks 96 of the rotating means 36 to effect the counterclockwise rotation of the pulley wheel 94 and link engaging members 102. During this rotation, the upper bars 110 of members 102 engage the upper surfaces 114 of their respective links 15,16 and rotate the link section 14 to its starting position. With the link section 14 in this position, the bushing 20 is clamped by further extension of the press jack 58. The jack 58 may be of sufficient capacity to exert a force of approximately 250 tons (2225 kN) on the bushing, depending on the size of the link assembly 12 and the degree of press fit between the links and the bushing. In accordance with the present invention, the first exertion of the full clamping force is effective in causing the deformation of the inserts 62 of the jaws 41,42,43 so that the inserts substantially conform to the shape of the bushing's outer surface 29 being engaged by each of the inserts including any wear pattern 31 that the bushing may have. During the deformation of the inserts 62, the apertures 66 and grooves 68 provide space into which material of the insert can extrude, as shown in FIG. 10, to facilitate the ability of the surface 69 to conform to and intimately contact substantially the entirety of the abutting surface of the bushing. Thus, the inserts are readily capable of conforming to the one sided wear patterns 31 on the bushing so that little, if any, surface contact is lost with the bushing and the clamping forces are generally evenly distributed throughout the area contacted by the inserts.

Fourth, the links 15,16 are rotated by the rotating means 36 while the bushing is maintained in a stationary position by the clamping means 34. This is accomplished by the retraction of jacks 96 and the extension of jacks 98, which rotates the pulley wheel 94 in a clockwise direction as shown in FIG. 7 and causes the lower bars 108 of the link engaging members 102 to engage the lower surfaces 112 of the links 15,16. The jacks 96 have sufficient capacity to overcome the frictional force created by the press fit connection between the links and the bushing to effect the rotation of the links about the bushing. A torque of about 50,000 lbs. ft. (68,000 N-m) has been found to be sufficient for this purpose.

Last, the jaws 41,42,43 are reopened to their positions shown in FIG. 4, allowing the link assembly to be indexed to the next bushing to be turned. The above sequence is then repeated until all of the bushings 20 of the link assembly 12 are turned. While the above sequence illustrates the links 15,16 being rotated in a clockwise relation to the bushing 20, it should be understood that the apparatus 10 is equally capable of rotating the links in a counterclockwise direction as well, if such is desired.

Due to the offset configuration of the ram 58, the apparatus 10 herein described is capable of turning each bushing approximately 135° during the above described sequence, which is sufficient, in most cases, to present an entirely unworn surface portion of the bushing to the drive sprocket of the vehicle on which the track link assembly 12 is used. However, it should be understood that slight modifications may be made to the apparatus 10 herein described to obtain a greater or lesser number of degrees of rotation without departing from the teachings of the present invention.

Other aspects and advantages of this invention can be obtained from a study of the drawings, the disclosure, and the appended claims.

I claim:

1. Apparatus for turning a track bushing relative to its respective set of links of a track chain link assembly, said links being press fittedly connected to said bushing, comprising:

means for clamping said bushing about its outer peripheral surface with a clamping force sufficient to restrain the bushing against an application of a torque of sufficient magnitude to overcome the press fit connection between the bushing and the links, said clamping means having at least one deformable insert engageable against said bushing, said insert being of a sufficiently soft material to conform to and have intimate clamping contact with the bushing upon and under the application of said clamping force; and means for selectively rotating the links a predetermined angular distance relative to said bushing while said bushing is being restrained by said clamping means.

2. The apparatus of claim 1 wherein said clamping means includes:

a rigid support block having an arcuate surface facing said bushing and on which said insert is carried, said arcuate surface having a plurality of discontinuities therein defining cavities into which the material of the insert is extruded upon application of said clamping force for facilitating the ability of the deformable insert to conform to the bushing.

3. The apparatus of claim 2 wherein said discontinuities include a plurality of grooves, disposed longitudinally of said arcuate surface of the block and defining a mechanical interlock between the block and insert to restrain rotational movement therebetween.

4. The apparatus of claim 3 wherein said rotating means includes at least one link engaging member and means for rotatably mounting said member for rotation about an axis disposed in general alignment with the longitudinal axis of the bushing being clamped by said clamping means, said link engaging member having a portion positionable in abutting engagement with at least one of said links connected to said bushing at a position disposed a predetermined radial distance from said axis.

5. The apparatus of claim 4 wherein said clamping means includes:

at least three jaws, each of which includes one of said support blocks and one of said deformable inserts;

a movable ram having a first inwardly facing surface; and a V-block having second and third inwardly facing surfaces, the three inwardly facing surfaces of the ram and V-block being disposed in a triangular configuration and each mounting a respective one of said jaws.

6. The apparatus of claim 1 wherein said rotating means includes a link engaging member and means for rotatably mounting said link engaging member about an axis disposed in general alignment with the longitudinal axis of the bushing being clamped by said clamping means, said link engaging member having a portion thereof positionable in abutting engagement with at least one of said links at a position disposed a predetermined radial distance from said axis.

7. The apparatus of claim 6 wherein said rotatable mounting means includes a pulley wheel which carries said link engaging member and is mounted for rotation about said axis, and said rotating means further includes a pair of jacks and a flexible pull, said flexible pull being entrained about said pulley wheel and connected thereto so as to impart a rotating torque to said wheel and having its opposite ends attached to a respective one of said jacks.

8. The apparatus of claim 7 wherein said link engaging member has a second portion positionable in abutting engagement with said link, said portions being spaced apart a sufficient distance to permit the ingress and movement of the link assembly therebetween and disposed to engage opposite upper and lower surfaces of the links for rotation of the links in opposite directions.

9. The apparatus of claim 8 wherein said rotating means includes two opposing sets of apparatus, each set being disposed on a respective one of the opposite sides of the clamping means, and each including one of said link engaging members, pulley wheels, flexible pulls, and pair of jacks, said link engaging members of each set engaging a respective one of said set of links.

10. The apparatus of claim 1 wherein said deformable insert is aluminum.

11. Apparatus for turning a track bushing relative to its respective set of links of a track chain link assembly, said links being secured to the bushing by means of a heavy press fit, comprising:

means for rotating said links about the axis of said bushing; and means for clamping said bushing with a predetermined clamping force of a sufficient magnitude to maintain said bushing in a fixed position during rotation of said links, said clamping means including three jaws, a movable ram, and a fixed V-block, said ram carrying one of said jaws and said V-block carrying the second and third ones of said jaws, each of said jaws including a rigid support block and a deformable insert, said support block having an arcuate surface facing said bushing and said deformable insert having an arcuate configuration and being carried on the arcuate surface of said support block, said insert being of a sufficiently soft material to conform to and intimately contact said bushing upon and under the application of said clamping force.

12. The apparatus of claim 11 wherein said arcuate surface of the support block has a plurality of discontinuities therein defining cavities into which the material of the insert is extruded upon application of said clamping force for facilitating the ability of the insert to conform to the bushing.

13. The apparatus of claim 12 wherein said discontinuities include a plurality of grooves disposed longitudinally of said arcuate surface of the block, said grooves providing a mechanical interlock between the block and insert to restrain rotational movement therebetween when material of the insert has been extruded into said grooves.

14. The apparatus of claim 13 wherein said rotating means includes a link engaging member and means for rotatably mounting said link engaging member about an axis disposed in general alignment with the longitudinal axis of the bushing being clamped by said clamping means, said link engaging member having a portion thereof positionable in abutting engagement with at least one of said links at a position disposed a predetermined radial distance from said axis.

15. The apparatus of claim 14 wherein said rotatable mounting means includes a pulley wheel connected to said link engaging member and mounted for rotation about said axis, and said rotating means further includes a pair of jacks and a flexible pull, said flexible pull being entrained about said pulley wheel and connected thereto so as to impart a rotating torque to said wheel and having its opposite ends attached to a respective one of said jacks.

16. The apparatus of claim 15 wherein said link engaging member has a second portion positionable in abutting engagement with said link, said portions being spaced apart a sufficient distance to permit the ingress and movement of the link assembly therebetween and disposed to engage opposite upper and lower surfaces of the links for rotation of the links in opposite directions.

17. The apparatus of claim 16 wherein said rotating means includes two opposing sets of apparatus, each set being disposed as a respective one of the opposite sides of the clamping means, and each including one of said link engaging members, pulley wheels, flexible pulls, and pair of jacks, said link engaging members of each set engaging a respective one of said set of links.

18. The apparatus of claim 11 wherein said deformable insert is aluminum.

19. The apparatus of claim 11 further including means for selectively opening the second and third jaws on the V-block to enable the radial insertion of the bushing therebetween.

20. The apparatus of claim 19 wherein said opening means includes slide apparatus for slidably mounting each of the jaws on a respective one of the surfaces of the V-block, a jack, a piston connected to said jack, a pair of connecting rods and an arm on each of said jaws, said connecting rods being operatively connected between said piston and a respective one of said arms to move said jaws from a closed position to an open position upon the actuation of said jack.

21. A method of turning a bushing of a track chain link assembly, said bushing having a set of links press fittedly connected to its opposite ends, comprising the steps of:

clamping said bushing with clamping means capable of exerting a predetermined clamping force on said bushing, said clamping means having at least one deformable insert engageable against said bushing, said insert being of a sufficiently soft material to conform to and have intimate clamping contact with the bushing upon and under application of said clamping force; and rotating said set of links a predetermined angular distance relative to said bushing.

22. The method of claim 21 wherein said link assembly includes a plurality of said bushings, each bushing having a set of said links press fittedly connected to the opposite ends thereof, further comprising the steps of:

releasing said bushing from said clamping means; and sequentially moving each of the other of said bushings of the link assembly into a position to be clamped by said clamping means and repeating the clamping and rotating steps until all of the bushings of the link assembly have been rotated.

* * * * *